United States Patent [19]

Duh

[11] Patent Number: 5,744,578
[45] Date of Patent: Apr. 28, 1998

[54] PROCESS FOR THE CRYSTALLIZATION OF POLYETHYLENE NAPHTHALATE PREPOLYMERS AND THE SOLID STATING OF THOSE CRYSTALLIZED PREPOLYMERS

[75] Inventor: Ben Duh, Tallmadge, Ohio

[73] Assignee: Shell Oil Company, Houston, Tex.

[21] Appl. No.: 832,411

[22] Filed: Apr. 2, 1997

[51] Int. Cl.$^6$ ........................................... C08F 6/10
[52] U.S. Cl. .................. 528/492; 528/298; 528/481; 528/491; 528/492; 528/495; 528/499; 528/503; 525/444; 526/71
[58] Field of Search .................... 528/298, 481, 528/491, 492, 495, 499, 503; 525/444; 526/71

[56] References Cited

U.S. PATENT DOCUMENTS

| | | | |
|---|---|---|---|
| 4,755,587 | 7/1988 | Rinehart | 528/272 |
| 4,963,644 | 10/1990 | Duh | 528/272 |
| 5,225,448 | 7/1993 | Maier et al. | 521/60 |
| 5,290,913 | 3/1994 | McAllister et al. | 528/483 |
| 5,523,361 | 6/1996 | Tung et al. | 525/439 |
| 5,532,335 | 7/1996 | Kimball et al. | 528/495 |

*Primary Examiner*—Samuel A. Acquah
*Attorney, Agent, or Firm*—Kim Muller

[57] ABSTRACT

A process is disclosed for the crystallization of a PEN prepolymer containing volatile components. The temperature is maintained in the range of about 20° C. above the Tg and about 10° C. below the Tm while the PEN prepolymer is agitated. The PEN prepolymer is present as chips or pellets. The crystallization is performed in the presence of a liquid or a mixture of liquids that do not degrade the polymer during crystallization. The liquid or liquids employed may be those whose vapor pressure at the amorphous PEN softening temperature are insufficient to forestall expansion of the pellets. When this class of liquid or liquids is employed, the crystallization vessel is pressurized with an inert gas, including air, to prevent the prepolymer expansion. If the liquid or liquids possess sufficiently high vapor pressures at the PEN softening temperature, the pellets do not expand even without the inert air pressurization.

33 Claims, No Drawings

5,744,578

1

PROCESS FOR THE CRYSTALLIZATION OF POLYETHYLENE NAPHTHALATE PREPOLYMERS AND THE SOLID STATING OF THOSE CRYSTALLIZED PREPOLYMERS

FIELD OF THE INVENTION

The field of this invention relates to the manufacture of polyethylene naphthalate polymers and copolymers thereof. This invention is concerned with the crystallization of polyethylene naphthalene prepolymers and with the solid stating of the crystallized polyethylene naphthalate prepolymers.

BACKGROUND OF THE INVENTION

Higher molecular weight polyesters are commonly produced from lower molecular weight polyesters of the same composition by solid state polymerization. The lower molecular weight polyesters which are used in such solid state polymerizations are generally prepared by conventional melt polymerization reactions. These are sometimes referred to as prepolymers. Solid state polymerization of prepolymers is generally considered advantageous in that the handling of high molecular weight ultra-high viscosity molten polymers during the polymerization phase is eliminated. Thermal degradation is also essentially avoided during the solid state portion of the polymerization of the prepolymers.

The lower molecular weight polyester prepolymers utilized in solid state polymerizations are generally in the form of pellets or chips. Such pellets can vary greatly in size; however, as a general rule, the smaller the size of the pellets of polyester prepolymer, the faster the solid state polymerization will proceed. Very fast rates of solid state polymerization can be attained by utilizing polyester prepolymers which are in the form of porous pills as described in U.S. Pat. No. 4,755,587 to Rinehart.

Most thermoplastic polyesters, including polyethylene terephthalate (PET) and polyethylene naphthalate (PEN), produced by melt-phase polymerization are almost completely amorphous in nature. Such amorphous polyester polymers which are prepared by melt polymerization are normally crystallized prior to solid state polymerization to raise their sticking temperature. This is done to keep pellets or chips of the polyester prepolymer being solid state polymerized from sticking together as a solid mass.

When an amorphous polyester is heated from ambient temperature to above its glass transition temperature (Tg), it will become soft and sticky before it starts to crystallize. The sticking temperature of an amorphous polyester is usually about 20° C. above its Tg. The crystallization rate of the polyester will not be fast enough to be practical until its temperature is further raised to about 30° C. above its sticking temperature. To achieve the maximum crystallization rate, the temperature of the polyester must be raised even higher. For example, PET has a Tg of 74° C. and a sticking temperature of about 95° C. The crystallization rate of PET is rather low until the temperature is raised to above 125° C. and in practice, PET is usually crystallized at temperatures between 150° C. and 190° C.

PEN is a relatively new and different polyester with promising properties for fiber and packaging applications. PET and PEN behave differently during crystallization as a result of their different physical and chemical properties. PEN has a Tg of about 120° C. and a crystalline melting point (Tm) of about 270° C. It exhibits a crystallization peak between 180° C. and 220° C. Its sticking temperature is

2 about 140° C. to 150° C. when it is in the amorphous state. According to conventional wisdom, the best crystallization temperature range for PEN is between 180° C. and 220° C.

In the crystallization process, the polyester undergoes a sticky stage. This takes place in the period between the time the polyester temperature exceeds the sticking temperature and the time the polyester becomes well crystallized. Therefore, most commercial-scale crystallizers for continuous crystallization of polyesters must provide vigorous agitation to prevent agglomeration or lumping of the polyester pellets. Two types of continuous crystallizers have been widely used, namely, agitated vessels and fluidized beds.

Heretofore, in the continuous crystallization process of particulate polyesters, PET in particular, the polyester pellets at ambient temperature without any pretreatment are directly charged into a crystallizer in which the heat transfer medium (e.g., hot air, hot nitrogen, or indirect hot oil contact) maintains a suitable crystallization temperature. Under appropriate operating conditions, the polyester pellets can be crystallized without lumping or agglomeration.

However, it has been determined by this inventor that when PEN pellets are exposed to the required crystallization conditions, the pellets undergo a sudden and rapid expansion as they are heated to near the crystallization temperature. This results in a puffed up skin of most of the pellets which become very sticky, and, within seconds, agglomerate tightly into big lumps, vigorous agitation notwithstanding. This indicates that the conventional commercial crystallization process used for PET is not suitable for commercial crystallization of PEN.

In Duh, U.S. Pat. No. 4,963,644, issued in October 1990, polyethylene naphthalate prepolymer is devolitalized at a temperature of 80° C. to 140° C. prior to crystallization to remove the volatile components of the prepolymer. This avoids the sudden volatilization of the volatile components contained in the pellets during crystallization, thereby avoiding deforming or puffing of the resultant prepolymer pellets.

McAllister et al, U.S. Pat. No. 5,290,913 discloses an improved process for crystallizing PET in the form of small particles by placing same in a liquid bath, agitating the bath using hot gases, such as steam, while simultaneously raising the temperature of the particles to a level at which crystallization takes place. While the steam used to heat the water may be held under greater than ambient pressure, the actual crystallization of the PET is performed in a vessel which is not designed for superatmospheric pressures. Kimball et al, U.S. Pat. No. 5,532,335 discloses a process for thermally processing polyester pellets. In this process, the pellets are introduced to the processing unit along with a liquid medium. The temperature is raised to slightly below the sticking temperature of the polyester. As this happens, the crystallinity increases. The disclosure is generic to all polyesters, such as PET or PEI, and does not confront the problem of crystallizing a PEN prepolymer with volatiles contained therein which must be considered for PEN where they do not have to be considered for PET or PEI.

This invention herein resides in the discovery that PEN pellets may be crystallized in the presence of a liquid, or mixture of liquids, and thereby deformation of the PEN pellets, during crystallization, is avoided.

SUMMARY OF THE INVENTION

Polyethlyene naphthalate resins can be made with desired molecular weight from melt phase polymers, referred to herein as prepolymers, by first crystallizing the prepolymer formed in the melt phase and then solid stating the crystallized prepolymer at conditions of elevated temperature over a period of time sufficient to build the desired molecular weight. The melt phase prepolymer however adsorbs moisture during pelletizing and from the atmosphere at ambient conditions. The moisture or water content of the prepolymer constitutes the major volatile component which must be accounted for during the heat up of the pellets during crystallization.

The invention described and claimed herein comprises crystallizing the prepolymer in the presence of a liquid or mixture of liquids. Some liquids or mixtures of liquids provide sufficiently high vapor pressure, at the desired temperature above the Tg, that they provide a pressure during crystallization which is at least equal to, or greater than, the vapor pressure of the volatile components contained in the PEN prepolymer. The pressure during crystallization is positive (with respect to atmospheric pressure). The amount of pressure necessary should be at least equal to the pressure which would be released in the event the prepolymer is heated during crystallization without first devolatizing the prepolymer.

Where the liquid or mixture of liquids are insufficient to provide this pressure during crystallization, a gas may be introduced to provide that pressure.

In accordance with this invention, the prepolymer may be crystallized, without or with partial devolitization, and without the sudden expansion of the volatile water content of the prepolymer which deforms the pellets prior to drying and solid stating or other processing steps for the crystallized prepolymer.

The crystallization herein occurs at a pressure at least equal to, or greater than, the vapor pressure of the volatile components contained in the PEN prepolymer. The pressure is supplied by the vapor pressure of the liquid or mixture of liquids alone or augmented by a gas which includes both nitrogen and air.

The exact empirical pressure necessary during crystallization varies with the volatile content of the prepolymer. Where the moisture or volatile content is less than about 0.06% water, visible or apparent deformation of the prepolymer will not occur when the prepolymer is crystallized at ambient pressure conditions. However, as the water content increases, the necessary crystallization pressure to avoid deformation of the prepolymer must correspondingly increase. As the water content in the pellet approaches equilibrium with the water content of the atmosphere, the crystallization pressure will reach a maximum necessary to avoid deformation of the prepolymer pellet. It is possible that the positive pressure may be as high as 70 psig to avoid pellet deformation but usually pressures of between 10 psig and 40 psig will be sufficient to avoid deformation of the pellet. It is understood herein that a measurement of 0 psig is equal to one atmosphere or approximately 14.7 psi at sea level.

DETAILED DESCRIPTION OF THE INVENTION

The polyethylene naphthalate (PEN) prepolymer utilized in accordance with the present invention is typically prepared by standard melt polymerization techniques. Such melt polymerizations result in the formation of PEN which is essentially totally amorphous in nature although it may contain small regions where crystallinity exists. The PEN is generally produced by melt polymerization using ethylene glycol and a naphthalene dicarboxylic acid, such as 2,6-naphthalene dicarboxylic acid, as monomers. However, it is also possible to prepare PEN prepolymer by polymerizing ethylene glycol with an ester of 2,6-naphthalene dicarboxylic acid. It is also contemplated that other diols and diacids may be present to modify the PEN.

The PEN prepolymer utilized in accordance with this invention typically has an initial starting intrinsic viscosity (IV) of at least about 0.2 dl/g as measured in a 60:40 phenol:tetrachloroethane solvent system at a temperature of 30° C. The amorphous PEN prepolymer will more preferably have an initial or starting IV of from about 0.3 to about 0.7 dl/g. The amorphous PEN prepolymer will more preferably have an initial IV of about 0.4 to about 0.5 dl/g.

The crystallization of the prepolymer is performed in a continuous process, or in a batch process, in vessels that are sometimes referred to as tumbler-dryers. The preferred process is the continuous process where the crystallization is performed in a fluidized bed or in an agitated vessel. It is necessary that the amount of agitation be sufficient so as to avoid the pellets sticking to one another.

The crystallization of the PEN is conducted in the presence of fluids including the presence of a liquid or mixture of two or more liquids. It is preferred that the liquid or mixtures of liquids not react with the PEN prepolymer or do not excessively degrade the polymer during crystallization. It is also important for commercial operations that the liquid or liquids employed be relatively inexpensive and readily separable from the polymer after crystallization by drying or by washing with a relatively low boiling liquid.

One class of liquids that can be employed are those liquids whose vapor pressure at the PEN prepolymer softening temperature may be insufficient to forestall the expansion of the prepolymer pellet. When this class of liquids are used, the crystallization vessel may be pressurized with air or nitrogen to a pressure sufficient to prevent rapid polymer expansion during crystallization. Examples of this class of liquids are ethylene glycol (EG), diethylene glycol (DEG), propane diol (PDO), and butane diol (BD). Among these liquids, EG is the preferred liquid because it is the least expensive and, even if EG does react with the PEN prepolymer, the structure of the polymer will remain unchanged.

A second class of liquids which may be employed in this process are those liquids whose vapor pressures at the PEN prepolymer softening temperature are high enough to prevent polymer expansion without augmenting the pressure in the crystallization vessel or step. Examples of these liquids are water, and mixtures of water and ethylene glycol. And if either liquid does react with the PEN prepolymer, its structure will remain unchanged. Other liquids, such as alcohols and other longer chain glycols can also be employed as the viable liquid or mixture of liquids.

The pressure in the crystallization zone must be equal to, or greater than the vapor pressure of the volatiles inside the prepolymer PEN pellet. While the water content in the prepolymer pellet is generally referred to herein as the volatile components of interest, it is also contemplated that other chemicals may add to the volatile content, such as acetaldehyde and ethylene glycol.

The pressure in the crystallization zone can be accorded by the presence of a gas atmosphere which may comprise air, nitrogen or mixtures thereof or supplied by the vapor pressure of the liquid or mixture of liquids. Other gases may also be present. Any gases which are present should not be reactive to the prepolymer to the extent that they have a deleterious affect upon the ultimate polymer. The preferred gases are exemplified by ethylene glycol vapor, water vapor, air, nitrogen, argon, helium and the like. Any gases added to the crystallization zone may be heated prior to entry to the equipment which should be rated for whatever positive pressure is anticipated by the volatile content of the PEN prepolymer.

The temperature of the prepolymer during crystallization will be within the range of about 20° C. above the Tg (glass transition temperature) to 10° C. below the Tm (melting point) of the PEN prepolymer.

If beneficial, the prepolymer may be partially devolatilized by heating at a temperature between 80° C. and 140° C. to remove some of the volatiles from the prepolymer prior to the positive pressure crystallization practiced herein. When these volatiles in the prepolymer are partially removed, a relatively lower positive pressure will be needed to prevent the remaining volatiles from expanding during crystallization and thereby deforming the pellets.

The amount of time required for the crystallization step will depend upon the temperatures utilized. Higher temperatures naturally require shorter periods of time to achieve the requisite degrees of crystallization. For example, at a temperature of 150° C., the time required for crystallization is about 30 minutes to 1 hour. At a temperature of 200° C. only about a few minutes are required for crystallization. The optimum period of time required for crystallization will also be somewhat dependent upon the equipment utilized and the size and shape of the pellets or chips. The time required for crystallization in a continuous process will typically be within the range of 5 minutes to 30 minutes and will more typically be within the range of about 7 minutes to about 20 minutes.

The polymer or prepolymer can be a homopolymer of PEN or a copolymer of PEN. The copolymers can be produced by replacing part of the precursor naphthalene dicarboxylic acid or dimethyl naphthalate with other dicarboxylic acids, such as terephthalic acid and isophthalic acid, in the manufacture of the prepolymer. It is preferred that the copolymer of PEN be a copolymer of PEN and polyethylene terephthalate (PET). The percentage of PEN and PET in the copolymer can vary but will usually range from 90% PEN to 10% PEN to 10% PET to 90% PET and preferably from 98% PEN to 2% PEN to 2% PET to 98% PET. While any of these percentages are within the scope of this invention, it is most preferred that the content of PEN in the copolymer be greater than 80% and most preferred that the PEN content be greater than 90%.

After the PEN prepolymer has been crystallized, it can be dried and solid state polymerized in a batch or continuous process. Suitable solid state polymerization temperatures can range from a temperature just above the threshold temperature of the polymerization reaction up to a temperature within a few degrees of the sticking temperature of the crystallized PEN prepolymer, which is well below its melting point.

The solid state polymerization temperature utilized will typically be from about 1° C. to about 50° C. below the sticking temperature of the crystallized PEN prepolymer. The optimum solid state reaction temperature will differ somewhat for prepolymers of different compositions. As a general rule, the optimum solid state polymerization temperature for the homopolymer PEN prepolymer will be from about 5° C. to about 20° C. below its sticking temperature. For example, in the solid state polymerization of crystalline PEN, the temperature employed normally ranges from about 210° C. to about 265° C. Generally, the crystalline PEN prepolymer will be solid state polymerized at a temperature of from about 230° C. to about 265° C. In most cases, PEN prepolymer will be solid state polymerized at a temperature of from 240° C. to 260° C.

As the solid state polymerization of PEN prepolymer proceeds, its sticking temperature increases. Thus, the solid state polymerization temperature can be incrementally increased during the course of the polymerization. For example, U.S. Pat. No. 3,718,621 describes such a technique in the solid state polymerization of PET prepolymer.

The solid state polymerization is conducted in the presence of a stream of an inert gas or under a vacuum. Normally, in a continuous process, solid state polymerization is conducted in the presence of an inert gas stream. It is highly desirable for the inert gas to flow uniformly throughout the solid state polymerization zone which is filled with the crystallized polyester prepolymer which is being polymerized. In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the polyester prepolymer in it. It should be noted that the inert gas actually flows around the pellets or chips of polyester prepolymer as it streams through the solid state polymerization zone.

Some suitable inert gases for use in the solid state polymerization process of this invention include nitrogen, carbon dioxide, helium, argon, neon, krypton, xeon, and certain industrial waste gases. Various combinations or mixtures of different inert gases can also be used. In most cases nitrogen will be used as the inert gas. In a continuous process, the mass flow ratio of PEN prepolymer to nitrogen gas will be within the range of about 1:0.25 to about 1:1.

The continuous solid state polymerization reactor employed can comprise a fluidized bed or a moving bed. In most cases, it is preferred to utilize a cylindrical polymerization reactor wherein the PEN prepolymer flows through the reactor for the desired residence time. Such cylindrical reactors have a substantially uniform cross-section and a sufficient height to allow the PEN prepolymer to flow by reason of the force of gravity from the top to the bottom of the reactor in the desired residence time. In other words, the PEN prepolymer moves from the top to the bottom of such a cylindrical polymerization reactor in a partially dammed stated. The rate of flow through such a reactor can be controlled by regulating discharge at the bottom of the reactor. It is generally preferred to allow an inert gas to flow countercurrently (upwardly) through the reactor at a gas velocity well below the turbulence point so that the pellets or chips of PEN prepolymer are not fluidized (always remain in contact with each other). The pellets or chips of PEN prepolymer remain in substantially the same physical form throughout the solid state polymerization process.

The PEN prepolymer will be solid state polymerized for a time sufficient to increase its molecular weight or IV to that of the high molecular weight PEN resin desired. It will be desirable for the high molecular weight PEN resin being prepared to have an IV of at least 0.5 dl/g. In most cases the high molecular weight resin will have an IV of at least about 0.65 dl/g and for some applications will preferably have an IV of at least about 0.8 dl/g. The polymerization time needed will normally range from about 1 to about 36 hours and in most cases will range from 6 to 24 hours.

EXAMPLES

This invention is illustrated by the following examples which are given merely for the purpose of illustration and are not to be regarded as limiting the scope of the invention or the manner in which it can be practiced. Unless specifically indicated otherwise all parts and percentages are given by weight.

density via a density measurement column and is reported as set forth in Table 1. Table 1 further shows the crystallization conditions and pellet appearances.

TABLE 1

Crystallization Conditions and Results

| Run No. | Polymer | Medium | Temp. deg. C | Pressure psig | Time min. | Density g/cc | Color | Pellet Appearance |
|---|---|---|---|---|---|---|---|---|
| 1 | A | EG | 170 | 0 | 5 | <1 | White | Polymer greatly expanded and puffed up. |
| 2 | A | EG | 170 | 30 | 5 | 1.348 | White | Normal |
| 3 | B | EG | 170 | 25 | 5 | 1.347 | White | Normal |
| 4 | A | Water | 160 | 75 | 5 | 1.343 | White | Normal |
| 5 | A | Water | 170 | 100 | 5 | 1.347 | White | Normal |

Example 1

A crystallization vessel was used in the following examples. It was fabricated with a 10" long ½" schedule 40 stainless steel pipe having an OD of 0.840" and an ID of 0.622". The crystallizer was fitted with a thermocouple, a pressure gauge and a needle valve. The tip of the thermocouple extended to about 1 inch above the bottom of the vessel so that it contacted the polymer sample during the experimental runs. The valve was used to pressurize and vent the vessel and provided control of the pressure in the vessel. All experimental pressures were recorded in psig such that 0 psig was equal to 1 atmosphere. Whenever atmospheric crystallization was attempted the valve was left open during crystallization. When above 0 psig was desired the crystallizer was pressurized with compressed air before the crystallization was started. As the pressure inside the crystallizer increased due to an increase in the temperature, the gas or vapor was released from the vessel by adjusting the valve to obtained the desired and reported pressure.

Two polyethylene naphthalate prepolymers were used in the experiments summarized in Table 1. Polymer A was a PEN homopolymer having an IV of 0.475 dl/g, a DSC melting point Tm of 270° C., a glass transition temperature Tg of 120° C., a pellet size of 2.00 g/100, a moisture content of 0.538% and an acetaldehyde content of 83 ppm. Polymer B was a 95% PEN/5% PET copolymer based on mole % of repeat units. It possessed an IV of 0.453 dl/g, a Tm of 262° C., a Tg of 118° C., a pellet size of 2.01 g/100, a moisture content of 0.470% and an acetaldehyde content of 75 ppm. For both tested polymers the IV was measured in a 60/40 phenol/tetrachloroethane solvent at 30° C.

In runs 1–3 in Table 1, the crystallization was conducted in the presence of EG. Five (5) grams of the respective polymer and 15 ml of EG were charged into the crystallizer. In Runs 4 and 5, in Table 1, the crystallization was conducted in the presence of water. Five (5) grams of the respective polymer and 15 ml of water were charged into the crystallizer. The crystallizer was immersed in a thermostated diethylene glycol (DEG) bath and the temperature controlled as desired and shown in Table 1. The time when the polymer/air temperature reached within 1° C. of the targeted crystallization temperature was considered to be time zero. The crystallization was permitted to continue for the desired period of crystallization time. The heat up time to arrive at crystallization temperature was about 8 minutes. The crystallizer was removed from the DEG bath and immediately quenched in cold water to stop crystallization. The vessel was opened and the crystallized polymer was tested for density via a density measurement column and is reported as set forth in Table 1. Table 1 further shows the crystallization conditions and pellet appearances.

Density can be used to estimate the degree of crystallinity of a polyester provided the polyester mass does not contain voids. Thus, the degree of crystallinity of PEN can be related to its density by the following equation:

$$\text{Fractional crystallinity} = (Ds-Da)/(Dc-Da)$$

where Da=density of test sample (g/cc), Da=density of amorphous polymer, and Dc=density of polymer crystal. For PEN, Da=1.328 g/cc and Dc=1.408 g/cc. However, if the polymer expands significantly, the relationship of Equation (1) no longer holds. Therefore, the color of the crystallization products (i.e., clear, hazy, translucent, opaque, or white), were included in Table 1 to serve as an alternate indicator for crystallinity. As an amorphous polyester crystallizes, it changes from clear to hazy, translucent, opaque, and white. In general, an opaque PEN or copolymer should have a sufficient crystallinity to prevent sticking in a hopper dryer.

In Run 1, crystallization was conducted at 170° C. under atmospheric pressure (0 psig). As expected, the polymer puffed up and the pellets burst. As the crystallization pressure was increased by augmenting the vapor pressure of EG with compressed air (Runs 2 and 3), the pellets obtained were normal crystallized pellets. When the crystallization pressure was increased above 25 psig, no significant polymer expansion was observed and crystallized pellets with normal shape were obtained. This demonstrates that, according to the process of this invention, with a sufficiently high pressure in the crystallizer, untreated PEN pellets can be crystallized without pellet expansion or puffing.

In Run 3, Polymer B was crystallized in the EG medium. It can be seen that this naphthalate-containing copolyester behaved similarly to PEN homopolymer (Polymer A) under similar conditions. At a crystallization temperature of 170° C. and a crystallization pressure of 25 psig, well crystallized pellets with normal shape were obtained. Since the crystallized pellet shape appeared normal and there was no excessive pellet lumping during crystallization, these crystallization pressures are considered acceptable. Clearly, when the crystallization pressure was raised to 25 psig and above, well crystallized pellets with no expansion were obtained.

In Runs 4 and 5, PEN homopolymer (Polymer A) was crystallized in the water medium at 160° C. and 170° C., respectively, under the vapor pressure of water of 75 psig and 100 psig, respectively. Well crystallized pellets with normal appearance were obtained. Since the vapor pressure of water at the two crystallization temperatures was sufficient to prevent pellet expansion, no additional gas was needed to augment the pressure inside the crystallization vessel.

Example 2

Each of the prepolymers crystallized in runs 2–5 was dried in a drying tube at 180° C. with a stream of dried air for 4 hours to reduce the moisture content of the polymer to below 0.005%. No pellet expansion or deformation was observed during the drying.

Example 3

The crystallized and dried products obtained from Runs 2–5 are subjected to solid state polymerization at a temperature of 240° C. to 260° C. in a stream of nitrogen gas for a period of time of up to 20 hours. Reaction by-products generated in the solid state reactor are swept away by hot nitrogen gas. After this solid stating is performed the PEN homopolymer is suitable for use as a film, tire cord or packaging material.

Runs 2–5 in Example 1 demonstrate that amorphous PEN homopolymer and copolymers can be crystallized in the presence of a liquid, which provides a positive pressure, without expansion or deformation of the PEN pellet during crystallization. Also, once the pellets are sufficiently crystallized, they will not expand or deform during a subsequent drying (Example 2) and solid state polycondensation (Example 3). The minimum amount of liquid present and thereby positive vapor pressure required to prevent pellet expansion during crystallization, is a direct function of the quantity of the volatile contents in the prepolymer (moisture content in particular) and the softening temperature (between 140° C. and 150° C. for PEN homopolymer and lower for a PEN copolymer). The minimum amounts of pressure and liquid required will increase with increasing volatile contents and polymer softening temperature.

What is claimed is:

1. A process for the crystallization of an amorphous polyethylene naphthalate prepolymer containing volatile components which comprises heating said prepolymer at a temperature within the range of about 20° C. above the Tg and about 10° C. below the Tm of the prepolymer under agitation and, in the presence of a liquid, or mixture of liquids, sufficient to prevent the expansion of volatile components within said prepolymer, and to thereby produce a crystallized polyethylene naphthalate polymer.

2. The process of claim 1 wherein the prepolymer comprises a homopolymer.

3. The process of claim 1 wherein the prepolymer comprises a copolymer of polyethylene naphthalate (PEN) and polyethylene terephthalate (PET).

4. The process of claim 3 wherein the copolymer comprises 90% PEN and 10% PET.

5. The process of claim 1 wherein the liquid or mixture of liquids provides a vapor pressure, at the temperature in the range of about 20° C. above the Tg and about 10° C. below the Tm of the prepolymer, which is sufficient to prevent expansion of the volatile components within said prepolymer.

6. The process of claim 1 wherein, when the liquid or mixture of liquids provides a vapor pressure, at the temperature in the range of about 20° C. above the Tg and about 10° C. below the Tm of the prepolymer, insufficient to prevent expansion of the volatile components within said prepolymer, a sufficient pressure is provided by introduction of a gas.

7. The process of claim 6 wherein the gas comprises air, nitrogen or a combination thereof.

8. The process of claim 7 wherein the gas is a heated gas comprising from 4% to 21% oxygen.

9. The process of claim 1 wherein the liquid is selected from the group consisting of water and ethylene glycol.

10. The process of claim 1 wherein the mixture of liquids comprises a mixture of ethylene glycol and water.

11. The process of claim 1 wherein the prepolymer is prepared by the melt phase polymerization of ethylene glycol and 2,6- naphthalene dicarboxylic acid.

12. The process of claim 1 wherein the prepolymer is prepared by the melt phase polymerization of ethylene glycol and an ester of 2,6-naphthalene dicarboxylic acid.

13. The process of claim 1 wherein the prepolymer is heated at a temperature of 80° C. to 140° C. to at least partially devolitize the prepolymer prior to crystallization in the liquid or mixture of liquids.

14. A process for the solid state polymerization of a polyethylene naphthalate prepolymer which comprises heating said prepolymer at a temperature in the range of about 20° C. above the Tg and about 10° C. below the Tm of the prepolymer while agitating the prepolymer and in the presence of a liquid or mixture of liquids sufficient to prevent the volatile components contained in the prepolymer from expanding and to thereby produce a crystallized polyethylene naphthalate prepolymer and drying and then polymerizing said crystallized prepolymer under solid stating conditions at a temperature of from 50° C. to about 1° C. below the sticking temperature of the crystallized prepolymer for a period of time sufficient to produce a high molecular weight polyethylene naphthalate resin.

15. The process of claim 14 wherein the prepolymer comprises a homopolymer.

16. The process of claim 14 wherein the prepolymer comprises a copolymer of polyethylene naphthalate (PEN) and polyethylene terephthalate (PET).

17. The process of claim 16 wherein the copolymer comprises 90% PEN and 10% PET.

18. The process of claim 16 wherein the copolymer comprises from about 2% to about 98% PEN and from about 98% to about 2% PET.

19. The process of claim 14 wherein the liquid or mixture of liquids possesses a vapor pressure, at the temperature in the range of about 20° C. above the Tg and about 10° C. below the Tm of the prepolymer, which is sufficient to prevent expansion of the volatile components within said prepolymer.

20. The process of claim 14 wherein, when the liquid or mixture of liquids provides a vapor pressure, at the temperature in the range of about 20° C. above the Tg and about 10° C. below the Tm of the prepolymer, insufficient to prevent expansion of the volatile components within said prepolymer, a sufficient pressure is provided by the introduction of a gas.

21. The process of claim 20 wherein the pressure provided by the gas is air, nitrogen or combinations thereof.

22. The process of claim 14 wherein the solid stating conditions comprise an atmosphere of nitrogen.

23. The process of claim 14 wherein the prepolymer is prepared by the melt phase polymerization of ethylene glycol and 2,6-naphthalene dicarboxylic acid or esters thereof.

24. The process of claim 14 wherein the volatile components in the prepolymer comprise water which vaporizes as the prepolymer is heated to a temperature at which the prepolymer begins to soften.

25. The process of claim 14 wherein the liquid is selected from the group consisting of water and ethylene glycol.

26. The process of claim 14 wherein the mixture of liquids comprises a mixture of ethylene glycol and water.

27. A process wherein the prepolymer is heated to a temperature of 80° C. to 140° C. to at least partially devolitalize said volatile components in the prepolymer prior to crystallization as recited in claim 14.

28. The process of claim 20 wherein the mixture of vapor pressure and gas exert a pressure during crystallization equal to, or greater than 15 psig, and wherein the pressure is observed at a temperature of from about 20° C. above the Tg and about 10° C. below the Tm with respect to the prepolymer.

29. The process of claim 5 wherein the vapor pressure exerts a pressure during crystallization equal to, or greater than 15 psig, and wherein the pressure is observed at a temperature of from about 20° C. above the Tg and about 10° C. below the Tm with respect to the prepolymer.

30. The process of claim 28 wherein the pressure in the crystallization step is greater than 15 psig at 170° C.

31. The process of claim 29 wherein the pressure in the crystallization step is greater than 15 psig at 170° C.

32. The process of claim 5 wherein the vapor pressure, at a desired temperature, is dependent upon the total volatile content of the prepolymer and wherein, as the volatile content in the prepolymer increases, the pressure exerted by the vapor correspondingly increases.

33. The process of claim 19 wherein the mixture of vapor and gas exert a pressure, at a desired temperature, dependent upon the total volatile content of the prepolymer and wherein, as the volatile content in the prepolymer increases, the pressure exerted by the mixture of the vapor and gas correspondingly increases.

* * * * *